US011390253B2

(12) United States Patent
Gaucher et al.

(10) Patent No.: US 11,390,253 B2
(45) Date of Patent: Jul. 19, 2022

(54) CONNECTOR CONSTITUTING A WIPER BLADE AND WIPER BLADE COMPRISING SUCH A CONNECTOR

(71) Applicant: Valeo Systèmes d'Essuyage, Le Mesnil Saint Denis (FR)

(72) Inventors: Vincent Gaucher, Issoire (FR); Stéphane Houssat, Issoire (FR); Guillaume Mouleyre, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/728,418

(22) Filed: Dec. 27, 2019

(65) Prior Publication Data

US 2020/0207310 A1    Jul. 2, 2020

(30) Foreign Application Priority Data

Dec. 27, 2018 (FR) ..................................... 1874276

(51) Int. Cl.
*B60S 1/40* (2006.01)
*B60S 1/38* (2006.01)

(52) U.S. Cl.
CPC ........... *B60S 1/4038* (2013.01); *B60S 1/3806* (2013.01)

(58) Field of Classification Search
CPC ............................. B60S 1/4038; B60S 1/3806
See application file for complete search history.

(56) References Cited

U.S. PATENT DOCUMENTS

| 9,862,354 | B2* | 1/2018 | Bex ....................... B60S 1/3863 |
| 2004/0098821 | A1* | 5/2004 | Kraemer ............... B60S 1/3877 15/250.201 |
| 2006/0207050 | A1* | 9/2006 | Shanmugham ....... B60S 1/3858 15/250.43 |
| 2008/0263809 | A1* | 10/2008 | Bousset .................... B60S 1/32 15/250.32 |
| 2017/0197592 | A1* | 7/2017 | Friscioni ................. B60S 1/387 |

FOREIGN PATENT DOCUMENTS

| EP | 3064406 A1 | 9/2016 |
| KR | 2011 0036182 A | 4/2011 |

OTHER PUBLICATIONS

Preliminary Search Report in corresponding French Application No. 1874276, dated Oct. 29, 2019 (7 pages).

* cited by examiner

*Primary Examiner* — Andrew A Horton
(74) *Attorney, Agent, or Firm* — Osha Bergman Watanabe & Burton LLP

(57) ABSTRACT

The present invention relates to a connector (1) for a wiper blade, designed to be interposed between an adapter and a structural element of the wiper blade. The connector (1) extends longitudinally between a first longitudinal end (14) and a second longitudinal end (14). The connector (1) comprises at least one fixing block (22) configured such as mechanically to connect the connector (1) to the structural element of the wiper blade and a linking block (13) configured such as mechanically to connect the connector (1) to the adapter. The connector (1) comprises at least one skirt (23) that extends longitudinally from the fixing block (22). The skirt (23) comprises at least one rib (24) that extends between the fixing block (22) and one of the longitudinal ends (14).

15 Claims, 4 Drawing Sheets

[Figure 1]
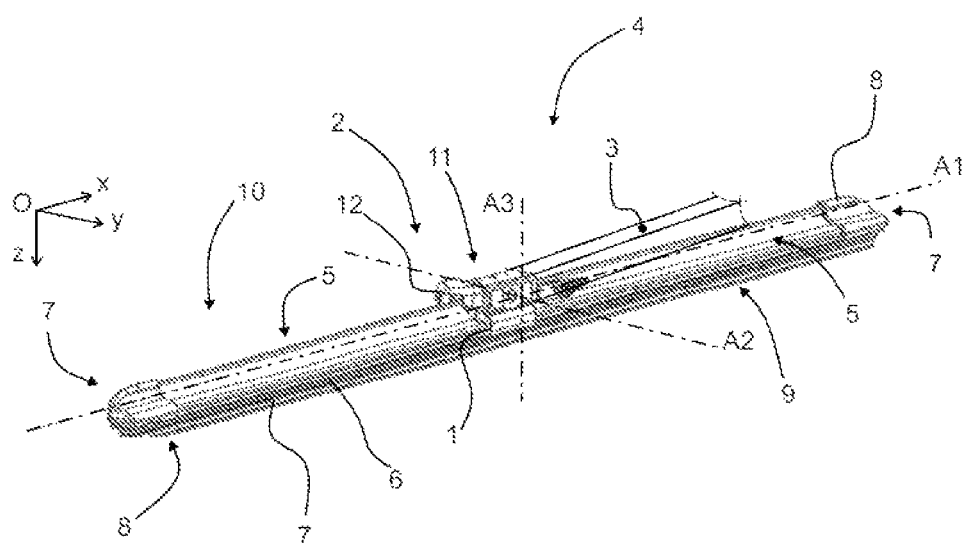
[Figure 2]
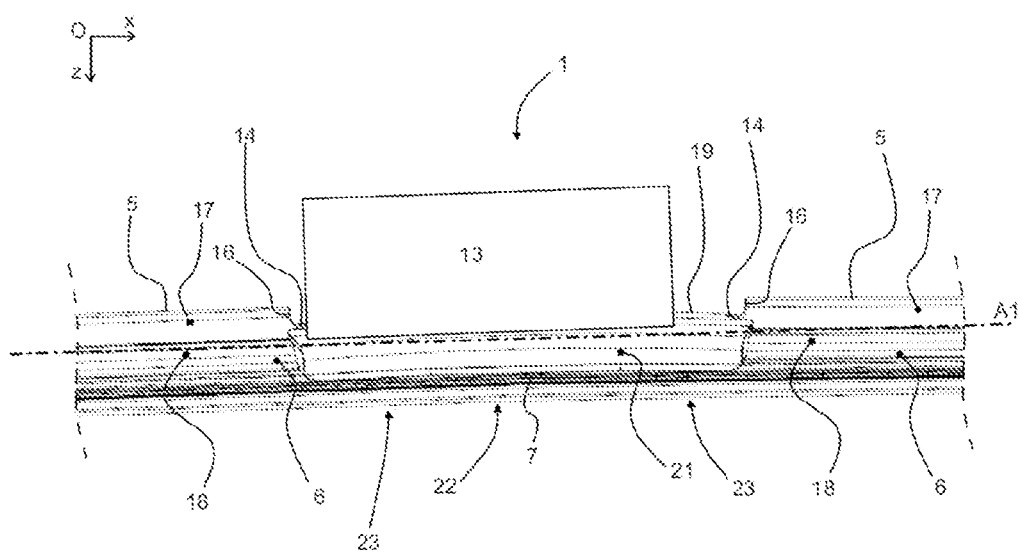

[Figure 3]
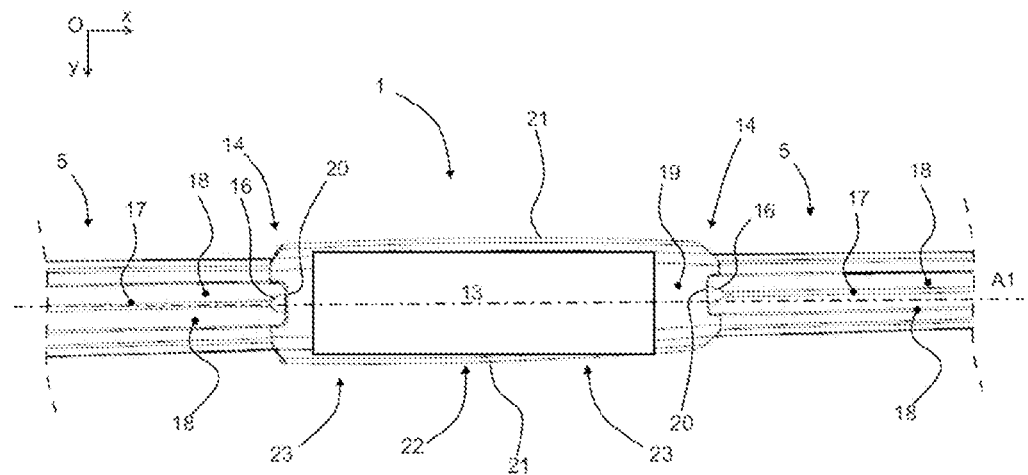
[Figure 4]
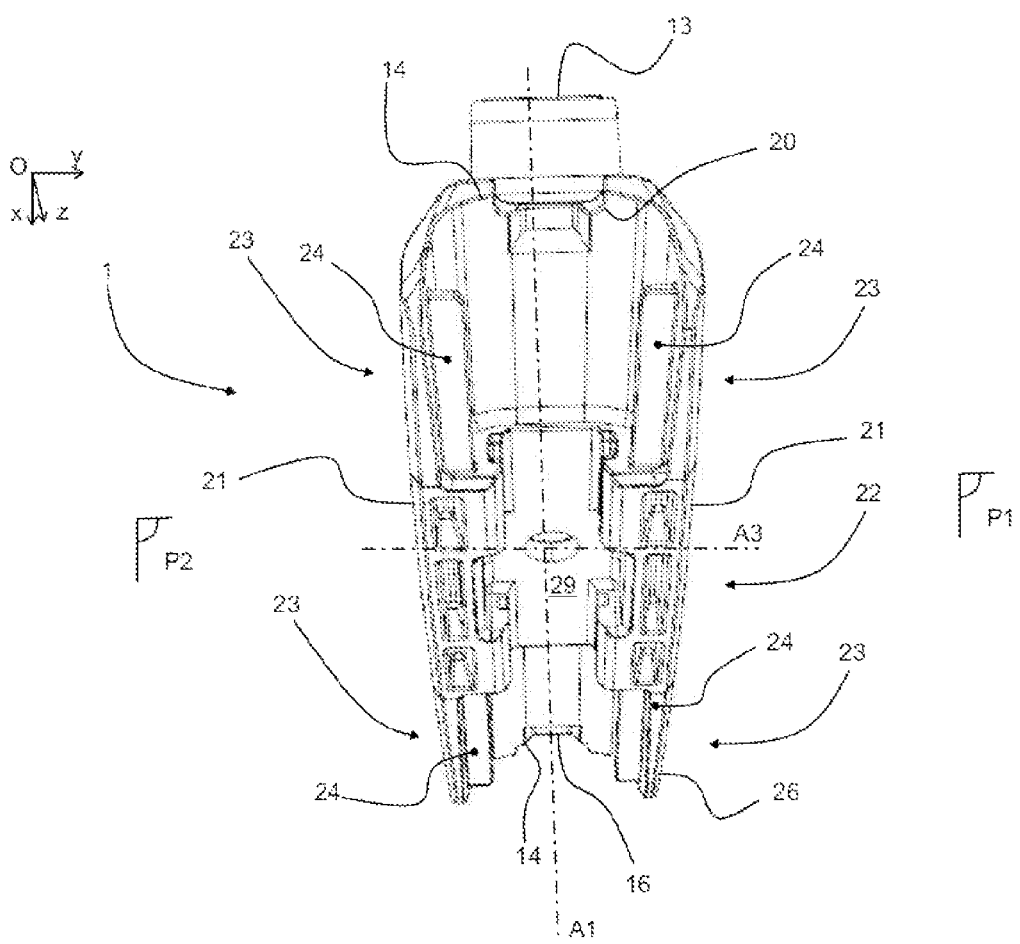

[Figure 5]
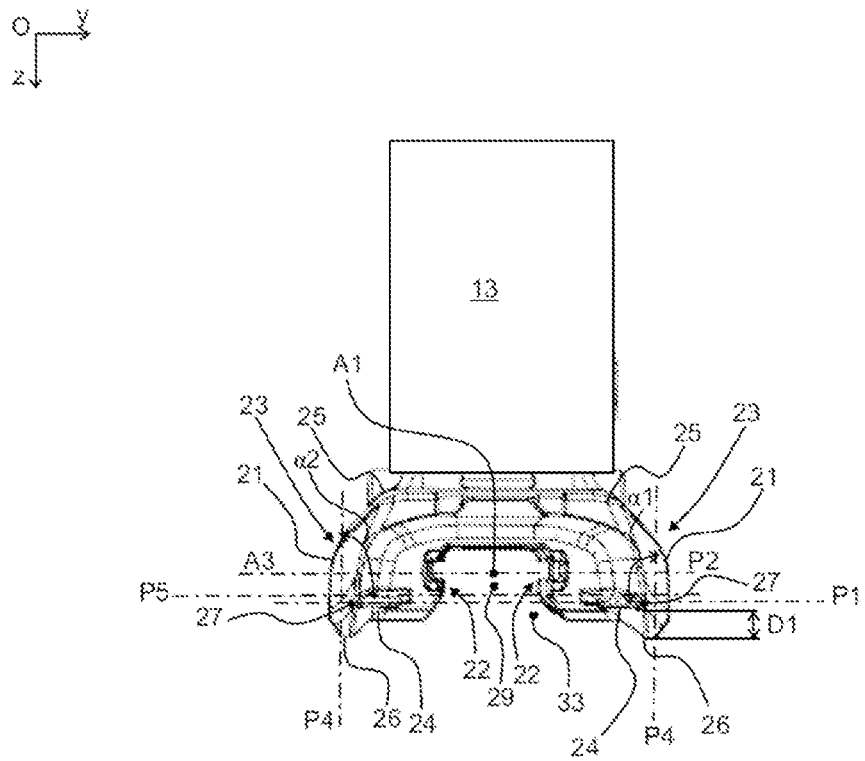
[Figure 6]
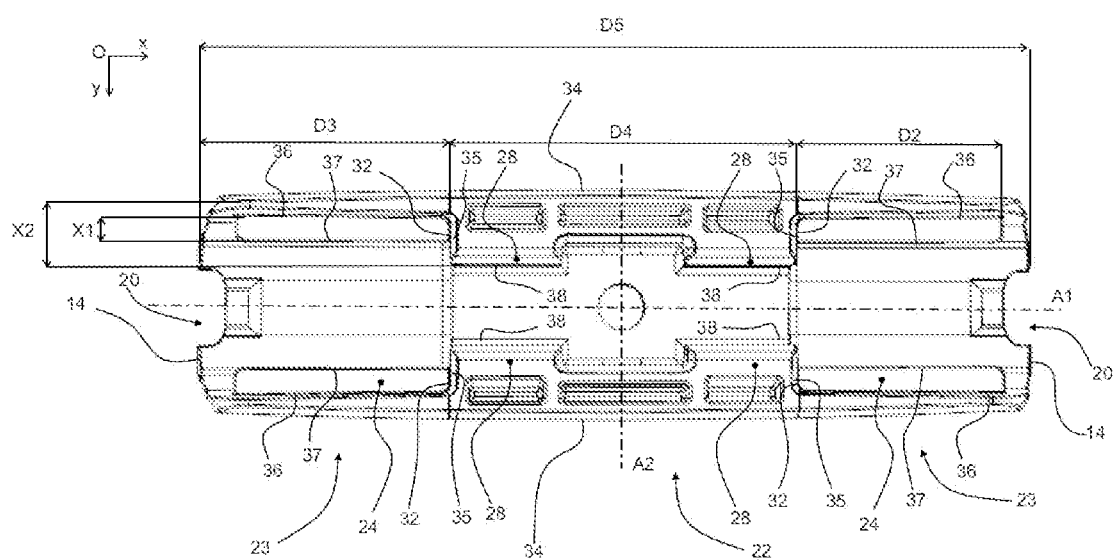

[Figure 7]
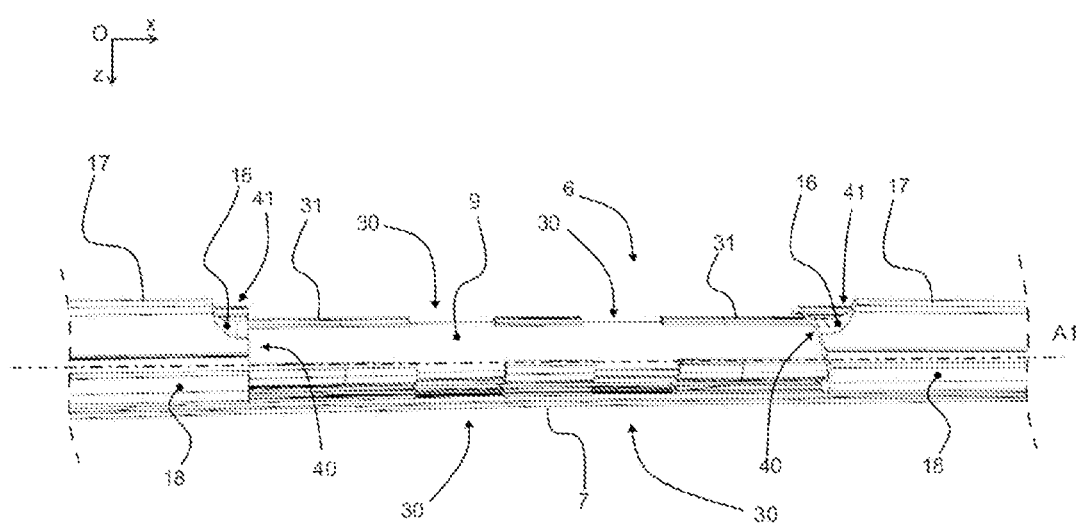

CONNECTOR CONSTITUTING A WIPER BLADE AND WIPER BLADE COMPRISING SUCH A CONNECTOR

FIELD OF THE INVENTION

The field of the present invention is that of wiper systems designed for equipping a motor vehicle. The present invention relates more particularly to a constituent connector of a wiper blade. The invention also relates to a wiper blade comprising such a connector.

BACKGROUND

A motor vehicle is usually equipped with a wiper system for sweeping across and washing a constituent glazed surface of the motor vehicle, such as a windscreen or a rear screen. The wiper system is designed to prevent a motor vehicle driver's view of his environment being disrupted. To that end, the wiper system comprises a drive arm that is equipped with a wiper blade and that performs an angular to-and-fro movement facing the glazed surface and within a field of view of the driver.

The wiper blade extends longitudinally along an axis of elongation and comprises an elongate structural element combining a support, a rigid metallic spine and a flexible scraper blade produced from a flexible material. The scraper blade is provided such as to rub against the glazed surface and to evacuate water by drawing it outside the driver's field of view.

The wiper blade also comprises one or two air deflectors lying along the axis of elongation of the wiper blade and two end fittings attached to each of the longitudinal ends of the wiper blade. The air deflector is arranged such as to convert a force generated by a stream of air circulating along the glazed surface into a force that presses the wiper blade against the glazed surface. The end fitting is designed to cover, at least in part, an end part of the structural element in such a manner as to mask that part. The end fitting is also provided such as to hold the air deflector and the structural element securely together.

The wiper blade also comprises a connector and an adapter. The connector comprises a fixing block configured such as mechanically to connect the connector to the structural element of the wiper blade and also comprises a linking block configured such as mechanically to connect the connector to the adapter. The adapter, meanwhile, is arranged such as to provide a mechanical link between the connector and the drive arm.

A first problem that arises lies in that the force exerted by the stream of air on the deflector usually tends to cause the deflector to pivot on itself about the axis of elongation of the wiper blade. Such pivoting gives rise to mechanical stresses and, in particular, torsional forces, between the various abovementioned components of the wiper blade. These mechanical stresses necessitate the proposal of a wiper blade that is as rigid as possible with a view to preventing twisting of the air deflector and potential breakage of the links between the components, or even the destruction of said components.

A second problem that arises lies in the fact that the wiper blade and, in particular, the connector, has slots and/or recesses inside which dirt is liable to lodge. Aside from the unattractive view perceived by the user of the motor vehicle through the glazed surface, such dirt is likely to impede or even to prevent a degree of mobility between the components, which may give rise to a malfunction of the wiper system.

A third problem that arises lies in that the least space that exists, such as the above-mentioned slits and recesses, between said components is likely to be used by a malicious pedestrian in order to detach the wiper blade and to steal all or part of it.

A fourth problem lies in that there is a need for a connector that is compatible with a wide range of air deflectors, at least one end fitting of which is likely to have an inclined profile relative to the axis of elongation of the wiper blade.

SUMMARY OF THE INVENTION

An object of the present invention is to propose a connector for a wiper blade that is arranged such as to address the abovementioned problems, the connector allowing a reliable, durable and secure mechanical link between each air deflector and the structural element of the wiper blade, the connector being compatible with a wide range of air deflectors, of which the end fittings are likely to have a variety of forms, the connector desirably, furthermore, being easy and inexpensive to produce, light in weight and as compact as possible.

A further object of the present invention is to propose a wiper blade that comprises such a connector and at least one deflector, of which a longitudinal length is as short as possible in order to economize on a material of which the air deflector is constituted, which is expensive and difficult to recycle.

A connector of the present invention is a connector for a wiper blade. The connector is designed to be interposed between an adapter and a structural element of the wiper blade. The connector extends longitudinally between a first longitudinal end and a second longitudinal end. The connector comprises at least one fixing block configured such as mechanically to connect the connector to the structural element of the wiper blade and a linking block configured such as mechanically to connect the connector to the adapter. The connector comprises at least one skirt that extends longitudinally from the fixing block.

According to the present invention, the skirt comprises at least one rib that extends between the fixing block and one of the longitudinal ends of the connector.

The connector advantageously comprises at least any one of the following technical features, taken alone or in combination:

the skirt has a "U" cross section, a base of which is constituted by a longitudinal wall of the connector and the arms are constituted by lateral walls of the connector, the rib emerging from one of the lateral walls in the direction of the other lateral wall, the rib emerges from the lateral wall in a joining zone of the lateral wall which is interposed between a free edge of the lateral wall and a linking zone of the lateral wall with the longitudinal wall, the joining zone and the free edge are separated by a first distance that is non-zero, the fixing block comprises at least two claws that delimit a tunnel configured such as to receive the structural element of the wiper blade, the rib extending in a rib longitudinal plane parallel to a longitudinal plane of the tunnel, the claws are capable of being accommodated inside respective indentations that are provided in the structural element such as to hold the structural element in position inside the tunnel, the rib emerges from the lateral wall in the joining zone of the lateral wall which is arranged between the longitudinal plane of the tunnel and the free edge of the lateral wall, the rib extends longitudinally over a second distance measured between a free longitudinal edge of the rib and the fixing block which is less than a third distance that separates the fixing block from the longitudinal end that delimits the skirt, the longitudinal wall extends in a longitudinal plane and the lateral walls extend in respective lateral planes that are substantially orthogonal to the longitudinal plane. It will be understood therefrom that the longitudinal plane forms an angle of between 80° and 100° with each of the lateral planes, the rib is, for example, a strip of material that extends, in particular, in a flat plane, the rib is made as one piece with the connector, the connector has a "U" cross section that delimits a cavity configured such as to receive the structural element of the wiper blade, the rib, the claw and the longitudinal wall of the skirt are provided inside respective longitudinal planes that are substantially parallel to one another. It will be understood, in particular, that the longitudinal wall of the skirt is likely to be slightly inclined relative to the rib and/or the claw. Thus, the skirt extending inside a skirt plane, the rib extending inside a rib plane and the claw extending inside a claw plane, the skirt plane is likely to form a first angle of between 0° and 15° with the rib plane and/or the skirt plane is likely to form a second angle of between 0° and 15° with the claw plane, the fixing block comprises four claws distributed longitudinally at respective corners of a quadrilateral, the fixing block thus comprises four claws, including a first pair of claws provided on a first lateral flank of the connector and a second pair of claws provided on a second lateral flank of the connector, the pairs of claws being transversely symmetrical to one another, the lateral wall of the skirt extends the lateral flank of the connector longitudinally, each pair of claws comprises two opposed longitudinal edges, at least one rib emerges from a longitudinal edge of a claw, at least one rib is made as a single piece with the lateral wall of the skirt, the rib extends between the longitudinal edge and the lateral wall, the connector comprises two ribs per skirt, the connector comprises two skirts provided longitudinally on either side of the fixing block. In this case, and advantageously, there may be a connector that comprises four ribs, a first width of the rib, taken between a free lateral edge of the rib and an internal face of the lateral wall of the connector, is between 30% and 100% of a second width of the claw measured between the internal face of the lateral wall of the connector and a free lateral edge of the claw, the first width is between 40% and 90% of the second width, the first width is between 50% and 80% of the second width, the second distance is between 75% and 100% of a fourth distance of the fixing block measured between two longitudinally opposed longitudinal edges of the fixing block, the second distance is between 85% and 90% of the fourth distance, the second distance is between 20% and 45% of a fifth distance of the connector measured between the first longitudinal end and the second longitudinal end of the connector, the second length is of the order of 30% of the third length to within 5%, a fourth width of the skirt of the connector measured between the longitudinal end of the connector and the fixing block is between 30% and 50% of the third length of the connector, the longitudinal wall of the skirt comprises at least one notch provided at one of the longitudinal ends of the connector for the passage of a wing of a constituent air deflector of the wiper blade, in other words, the notch opens on one of the longitudinal ends of the connector.

A further subject of the present invention is a wiper blade comprising such a connector.

The wiper blade advantageously comprises at least any one of the following features, taken alone or in combination:

a structural element formed at least by one support that mechanically connects at least one single spine to a scraper blade, the support being accommodated inside a cavity delimited by the connector, the wiper blade comprising at least one air deflector that comprises at least one means of attachment to the support, the air deflector abutting against at least the rib, the means of attachment comprises fitting elements and complementary fitting elements provided, respectively, on the air deflector and on the support, advantageously, the air deflector abuts against a plurality of ribs, the means of attachment comprises, in particular, hooks provided in the longitudinal extension of the longitudinal cavity of the connector which grip the support, the air deflector is an at least two-material component with a first portion made from a first material that is harder than a second material constituting a second portion of the air deflector, the first portion abutting against at least the rib, the second material is a thermoplastic elastomer, the first material is polypropylene, the air deflector comprising at least one terminal end component facing one of the longitudinal ends of the connector, the terminal end component comprises the second portion housed inside the notch and the first portion abutting against the free longitudinal edge of the rib, the first portion and the second portion of the deflector are longitudinally separated by a non-zero distance.

BRIEF DESCRIPTION OF THE DRAWINGS

Other features, details and advantages of the invention will become more clearly apparent upon reading the description given below by way of indication, with reference to the drawings, in which:

FIG. 1 is a general, perspective view of a wiper system comprising a wiper blade according to the present invention, FIG. 2 is a partial side view of the wiper blade illustrated in FIG. 1, FIG. 3 is a partial top view of the wiper blade illustrated in FIGS. 1 and 2, FIG. 4 is a general perspective view from below of a constituent connector of the wiper blade illustrated in FIGS. 1 to 3, FIG. 5 is a general view of an end of the connector illustrated in FIG. 4, FIG. 6 is a general bottom view of the connector illustrated in FIGS. 4 and 5, FIG. 7 is a partial side view of the wiper blade illustrated in FIG. 1.

DETAILED DESCRIPTION

It should first of all be noted that the figures present the invention in a detailed manner with a view to implementing the invention, it being possible, naturally, for said figures to be used to better define the invention, as appropriate.

In the figures, the terms longitudinal, transverse, vertical, lateral, left, right, upper and lower relate to orientation in an Oxyz orthonormal coordinate system, in connection with a connector 1 of the present invention and/or with a wiper blade 2, illustrated in FIG. 1, the connector 1 of which is a constituent part. In this coordinate system, the Ox axis represent the longitudinal direction, the Oy axis represents the lateral direction and the Oz axis represents the transverse direction of the object in question, irrespective of the connector 1 or the wiper blade 2. In this coordinate system, a longitudinal plane is parallel to the plane Oxy, a transverse plane is parallel to the plane Oyz and a lateral plane is parallel to a plane Oxz. These terms apply to the connector 1 alone or, alternatively, to the wiper blade 2 comprising the connector 1.

In FIG. 1, the wiper blade 2 of the present invention extends along a longitudinal axis A1, parallel to the Ox axis. The terms lateral, left and right relate to a position along a lateral axis A2, parallel to the Oy axis, on either side of the longitudinal axis A1. A transverse axis A3 indicates a transverse direction, parallel to that of the Oz axis. The terms upper or lower relate to orientations along the transverse axis A3, the term lower containing the plane of a glazed surface against which the wiper blade 2 is envisaged to scrape. For the longitudinal directions, the terms exterior or interior relate to a pivot point of the wiper blade 2 on a drive arm 3 of the wiper blade 2, the term interior corresponding to that part where the drive arm 3 and a half-blade extend, the term exterior corresponding to that part where the other half-blade extends.

A motor vehicle is usually equipped with a wiper system 4 for evacuating water and/or dirt present on a glazed surface, in particular a rear screen or a windscreen of the motor vehicle. The wiper system 4 comprises the drive arm 3, which is capable of performing an angular to-and-fro movement along and over the glazed surface. The wiper system 4 also comprises the wiper blade 2 that is carried by the drive arm 3 and arranged such as to evacuate water and dirt from the glazed surface.

The wiper blade 2 comprises a structural element 6 that confers, on the wiper blade 2, a degree of deformation in the Oxz plane and a curved deformation for an optimized application of the wiper blade 2 against the glazed surface. The structural element 6 comprises, in particular, a scraper blade 7 that is the component of the wiper blade 2 that is designed to come into direct contact with the glazed surface in order to evacuate water and/or dirt present on the latter. The scraper blade 7 is, for example, a flexible blade made from an elastic material, such as a polymer, particularly rubber. According to the example, the structural element 6 comprises, for example, at least one metal strip 9, otherwise called the spine 9. Such a metal strip 9 is advantageously a single strip, at least when seen in the Oxz plane. The metal strip 9 is provided such as to confer form and rigidity on the wiper blade.

The wiper blade 2 comprises at least one air deflector 5, preferably two air deflectors 5 distributed longitudinally on either side of the connector 1. The air deflector 5 is provided in order to convert a pressure applied by a stream of air circulating along the glazed surface into a force bearing on the wiper blade 2 against the glazed surface of the motor vehicle. The air deflector 5 is designed to prevent detachment of the wiper blade 7 from the glazed surface, in particular when the motor vehicle is travelling at high speed, the air deflector 5 even allowing a proportionally greater bearing of the scraper blade 7 against the glazed surface when the motor vehicle is travelling at high speed.

The wiper blade 2 also comprises an end fitting 8 at each of its longitudinal ends 7. Each end fitting 8 is provided such as to hold the air deflector 5 and the structural element 6 together, such an end fitting 8 covering an end part of the air deflector 5.

The air deflectors 5 and the structural element 6 together form a semi-rigid structure 10 that is borne by a connection device 11 interposed between an end part of the drive arm 3 and the semi-rigid structure 10. Such a connection device 11 comprises the connector 1 integral at least isostatically with the semi-rigid structure 10 and an adapter 12 connected by a pivot link to the connector 1.

In FIGS. 2 and 3, the connector 1 comprises a linking block 13 configured such as mechanically to connect the connector 1 to the adapter 12. The linking block 13 may comprise fitting members, such as strands or orifices, which interact with complementary fitting members, such as orifices or strands, also, provided in the adapter 12. The fitting members and the complementary fitting members form a pivot link between the connector 1 and the adapter 12.

The connector 1 extends along the longitudinal axis A1 between a first longitudinal end 14 and a second longitudinal end 14. The first longitudinal end 14 faces a terminal end component 16 of one of the air deflectors 5. The second longitudinal end 14 faces a terminal end component 16 of the other of the air deflectors 5. Each air deflector 5 comprises a central wing 17 interposed between two lateral arms 18 that engage on edges of the structural element 6. The air deflectors 5 also extend along the longitudinal axis A1.

The terminal end components 16 of the air deflectors 5 facing the longitudinal ends 14 of the connectors 1 are inclined towards the connector 1 and form a ramp descending from the top of the central ridge 17 towards the connector 1. In other words, the terminal end components 16 of the air deflectors 5 are bevelled towards the end of the air deflectors 5, the bevels, which may without distinction be straight or curved, being provided towards the connector 1.

The connector 1 comprises a longitudinal wall 19 that extends between the longitudinal ends 14 of the connector 1 that is provided inside a plane parallel to the Oxy plane. The longitudinal wall 19 is the wall of the connector 1 that is equipped with the linking block 13. The longitudinal wall 19 is provided with a notch 20 provided at each of the longitudinal ends 14 of the connector 1 such as to form a passage to the central wing 17 of each of the air deflectors 5. The connector 1 comprises two lateral walls 21 that jointly border the longitudinal wall 19 and are provided in a plane substantially parallel to the Oxz plane.

The connector 1 comprises a fixing block 22 that is configured such as mechanically to connect the connector 1 to the structural element 6 of the wiper blade 2. The connector 1 comprises two skirts 23 that extend longitudinally from the fixing block 22 towards a respective longitudinal end 14 of the connector 1. Each skirt 23 has a "U" cross section, a base of which is constituted by a portion of the longitudinal wall 19 of the connector 1 and the arms of which are constituted by a portion of the lateral walls 21 of the connector 1.

In FIG. 4, each skirt 23 comprises at least one rib 24 that extends from the fixing block 22 towards one of the longitudinal ends 14. In other words, each skirt 23 is equipped with a rib 24 that is interposed between the fixing block 22 and one of the longitudinal ends 14, without reaching the latter. Moreover, each rib 24 emerges from one of the lateral walls 21 towards the other of the lateral walls 21 that is laterally opposite it.

In FIG. 5, each lateral wall 21 extends between a linking zone 25 with the longitudinal wall 19 and a free edge 26 of the lateral wall 21. Each rib 24 emerges from the lateral wall 21 in a joining zone 27 of the lateral wall 21 that is interposed between the free edge 26 of the lateral wall 21 and the linking zone 25 of the lateral wall 21 with the longitudinal wall 19. The free edge 26 of the lateral wall 21 is the edge of the lateral wall 21 that is the furthest away from the longitudinal wall 19.

The joining zone 27 and the free edge 26 are separated by a first distance D1 that is non-zero. In other words, the rib 24 does not affect the free edge 26 of the lateral wall 21, but the rib 24 is provided set back transversely from the free edge 26 of the lateral wall 21.

The fixing block 22 comprises at least two claws 28 that delimit a tunnel 29 configured such as to receive the structural element 6 of the wiper blade 2. The rib 24 extends in a rib longitudinal plane P1 parallel to a longitudinal plane P2 of the tunnel.

The claws 28 are capable of being accommodated inside respective indentations 30, which can be seen in FIG. 7, which are provided in the structural element 6 such as to hold the structural element 6 in position inside the tunnel 29. More particularly, the indentations 30 are provided inside lateral edges of a support 31 that accommodates the metal strip 9 and a spur of the scraper blade 7. Thus, the support 31 is an element that forms an association between the metal strip 9, which confers rigidity on the structural element 6, and the scraper blade 7, the flexibility of which is needed for its circulation along the glazed surface. The support 31 is provided such as to be accommodated inside the tunnel 29.

The rib 24 emerges from the lateral wall 21 in a zone of the lateral wall 21 arranged between the longitudinal plane P2 of the tunnel and the free edge 26 of the lateral wall 21.

In FIGS. 5 and 6, the rib 24 extends longitudinally over a second distance D2 held between the fixing block 22 and a free longitudinal edge 32 of the rib 24, which is less than one third distance D3 separating the fixing block 22 from the corresponding longitudinal end 14 that delimits the skirt 23.

The rib 24 is, for example, a strip of material that extends in the rib longitudinal plane P1, being a single piece with the connector 1.

The connector 1 has a "U" cross section that delimits a longitudinal cavity 33 configured such as to receive the structural element 6 of the wiper blade 2. The support 31 comprises fitting elements interacting with complementary fitting elements provided on the air deflector 5 such as to secure the support 31 and the air deflector 5 together. These fitting elements and these complementary fitting elements constitute a means of attachment that may be in the form of hooks provided in the longitudinal extension of the longitudinal cavity 33 of the connector and which grip the support 31.

The ribs 24, the claws 28 and the longitudinal wall 19 of the skirt 23 are provided inside respective longitudinal planes that are substantially parallel to one another. It will be understood, in particular, that the longitudinal wall 19 of the skirt 23 is likely to be slightly inclined relative to the ribs 24 and/or to the claws 28. Thus, the skirt 23 extending inside a skirt plane P4, the ribs 24 extending inside the rib longitudinal plane P1 and the claws extending inside a claw longitudinal plane P5, the skirt longitudinal plane P4 is likely to form a first angle $\alpha 1$ with the rib longitudinal plane P1 of 80° and 100° and/or the skirt longitudinal plane P4 is likely to form a second angle $\alpha 2$ with the claw longitudinal plane P5 of between 80° and 100°.

The fixing block 22 preferably comprises four claws 28 distributed longitudinally at the respective corners of a quadrilateral. Thus, the fixing block 22 comprises four claws 28 including a first pair of claws 28 provided on a first lateral flank 34 of the connector 1 and a second pair of claws 28 provided on a second lateral flank 34 of the connector 1, the pairs of claws 28 being transversely symmetrical to one another.

The lateral wall 21 of the skirt 23 extends the lateral flank 34 of the connector 1 longitudinally. Each pair of claws 28 comprises two opposite longitudinal edges 35. Each rib 24 emerges from a longitudinal edge 35 of a claw 28. Each rib 24 is integral with an internal face 36 of the lateral wall 21 of the skirt 23, the internal face 36 of the lateral wall 21 bordering the longitudinal cavity 33 of the connector 1. The rib 24 extends between the longitudinal edge 35 of a claw 28 and the internal face 36 of the lateral wall 21.

A first width X1 of the rib 24 measured between a free lateral edge 37 of the rib 24 and the internal face 36 of the lateral wall 21 of the connector 1 is between 30% and 100% of a second width X2 of the claw 28 measured between the internal face 36 of the lateral wall 21 of the connector 1 and a free lateral edge 38 of the claw 28. Preferably, the first width X1 is between 40% and 90% of the second width X2. Again, preferably, the first width X1 is between 50% and 80% of the second width X2.

The second distance D2 is between 75% and 100% of a fourth distance D4 of the fixing block 22 measured between two longitudinally opposite longitudinal edges 35 of the fixing block 22. Preferably, the second distance D2 is between 85% and 90% of the fourth distance D4.

The second distance D2 is between 20% and 45% of a fifth distance D5 of the connector 1 measured between the first longitudinal end 14 and the second longitudinal end 14 of the connector 1. Preferably, the second distance D2 is of the order of 30% of the fifth distance D5 to within 5%.

The third distance D3 of the connector 1 is between 30% and 50% of the fifth distance D5 of the connector 1.

These provisions are such that the air deflector 5 abuts against at least the rib 24. Advantageously, the air deflector 5 abuts against a plurality of ribs 24.

The air deflector 5 being an at least two-material component with a first portion 41 made from a first material that is harder than a second constituent material of a second portion 40 of the air deflector 5, the first portion 41 abuts against at least the rib 24. The second material is, for example, a thermoplastic elastomer whilst the first material is, for example, polypropylene.

The first portion 41 and the second portion 40 of the air deflector are longitudinally separated by a non-zero distance by reason of the ramp arrangement of the terminal end component 16 of the air deflector 5.

All these provisions are such that mechanical stresses and, in particular, torsional forces, applied by a stream of air on the air deflectors 5, do not cause twisting of the air deflector 5 or any breakages of the links of the constituent components of the wiper blade 2, particularly by virtue of the abutment of the first portion 41, which abuts against at least the rib 24.

All these provisions are such that the ribs 24 constitute obstacles against dirt ingress inside the connector 1 and block off attempts to insert an object inside the connector with a view to detaching the wiper blade 2 therefrom.

All these provisions are such that the connector 1 is compatible with a wide range of air deflectors 5, at least one terminal end component 16 of which is capable of having an inclined profile relative to the axis of elongation of the wiper blade 2.

The invention claimed is:

1. A connector for a wiper blade, the connector being, interposed between an adapter and a structural element of the wiper blade, and extending along an axis in a first direction between a first longitudinal end and a second longitudinal end, the connector comprising:
   a fixing block configured mechanically to link the connector to the structural element of the wiper blade and a linking block configured mechanically to connect the connector to the adapter; and
   a first skirt that extends along the axis in the first direction from the fixing block toward the first longitudinal end, wherein:
   the first skirt comprises a rib that extends along the axis in the first direction between the fixing block and the first longitudinal end;
   the first skirt has, in a first plane perpendicular to the first direction, a U-shaped cross-section comprising a base constituted by a longitudinal wall of the connector and two legs constituted by two lateral walls of the connector,
      wherein the base is in a second plane perpendicular to the first plane, the second plane including the axis in the first direction and being substantially parallel to a surface to be wiped by the wiper blade;
   the rib emerges from a joining zone in one of the two lateral walls toward the other of the two lateral walls, wherein, in the U-shaped cross section, the joining zone is at one of the two legs between a free end of the one of the two legs and an intersection of the one of the two legs with the base.

2. The connector according to claim 1, wherein the fixing block comprises at least two claws that delimit a tunnel configured such as to receive the structural element of the wiper blade, the rib extending in a rib longitudinal plane parallel to a longitudinal plane of the tunnel.

3. The connector according to claim 2, wherein the rib emerges from the lateral wall in the joining zone of the lateral wall which is arranged between the longitudinal plane of the tunnel and the free end of the one of the two legs.

4. The connector according to claim 3, wherein a first width of the rib, taken between a free lateral edge of the rib and an internal face of the lateral wall of the connector, is between 30% and 100% of a second width of the claw measured between the internal face of the lateral wall of the connector and a free lateral edge of the claw.

5. The connector according to claim 1, wherein the rib extends longitudinally over a first length (D2) measured between a free longitudinal edge of the rib and the fixing block which is less than a second length (D3) that separates the fixing block from the longitudinal end that delimits the first skirt.

6. The connector according to claim 5, wherein the first length (D2) is between 75% and 100% of a third length (D4) of the fixing block measured between two longitudinally opposed longitudinal edges of the fixing block.

7. The connector according to claim 5, wherein the first length (D2) is between 20% and 45% of a fourth length (D5) of the connector measured between the first longitudinal end and the second longitudinal end of the connector.

8. The connector according to claim 1, wherein the longitudinal wall of the first skirt comprises at least one notch provided at one of the longitudinal ends of the connector.

9. A wiper blade comprising the connector according to claim 1.

10. The wiper blade according to claim 9, further comprising:
    the structural element formed at least by one support that mechanically connects at least one spine to a scraper blade,
    the support being accommodated inside a longitudinal cavity delimited by the connector; and
    at least one air deflector that comprises at least one means of attachment to the support, the air deflector abutting against at least the rib.

11. The wiper blade according to claim 10, the air deflector is an at least two-material component with a first portion made from a first material that is harder than a second material constituting a second portion of the air deflector, the first portion abutting against at least the rib.

12. The wiper blade according to claim 11, the air deflector comprising at least a terminal end component facing one of the longitudinal ends of the connector, wherein the terminal end component comprises the second portion accommodated inside the notch and the first portion abutting against the free longitudinal edge of the rib.

13. The wiper blade according to claim 12, wherein the first portion and the second portion of the air deflector are separated longitudinally by a non-zero distance.

14. The wiper blade according to claim 1, wherein the base of the first skirt in the U-shaped cross section is sufficiently wide to accommodate an entire cross-sectional width of the wiper blade between the two legs.

15. The wiper blade according to claim 1, wherein, on the axis in the first direction, the fixing block is arranged between the first skirt and a second skirt, between the first longitudinal end and the second longitudinal end.

* * * * *